United States Patent Office 3,277,143
Patented Oct. 4, 1966

3,277,143
METHOD FOR PREPARING CHLORO-THIOLFORMATES
Harry Tilles, El Cerrito, Calif., assignor to Stauffer Chemical Company, New York, N.Y., a corporation of Delaware
No Drawing. Filed June 10, 1965, Ser. No. 463,047
1 Claim. (Cl. 260—455)

This application is a continuation-in-part of my copending application Serial Number 218,160, filed August 20, 1962, now abandoned. This invention relates in general to an improved method for the preparation of chlorothiolformates.

Various methods are known for the preparation of lower alkyl and phenyl chlorothiolformates, but each of these afford only relatively low yields and impure products. Further, certain known methods require a number of days for completion, require refrigerated cooling and large volumes of reaction mixture, do not afford uniform results (exhibiting sensitivity to reaction conditions) or require the preparation of lead mercaptides.

The present inventor's U.S. Patent No. 3,093,537 discloses the use of activated carbon as a selective catalyst for the following reaction:

Generally, the present invention relates to the process wherein a mixture of the appropriate mercaptan and phosgene are reacted in the presence of an amide which acts as a catalyst for the reaction:

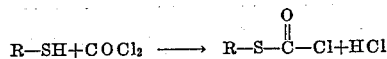

wherein R is alkyl, cycloalkyl, lower alkenyl, aryl, alkaryl, aralkyl, haloaryl, haloarylalkyl, and carbolkoxyalkyl.

As examples of organic mercaptans which can be suitably used in the reaction of the present invention are alkyl mercaptans such as methylmercaptan, ethylmercaptan, isopropylmercaptan, n-propylmercaptan, isobutylmercaptan, n-butylmercaptan, 2-pentylmercaptan, isoamylmercaptan, n - amylmercaptan, and the like. As examples of cycloalkyl mercaptans the following may be employed: cyclopentylmercaptan, cyclohexylmercaptan, 2-methylcyclohexyl mercaptan, 3-methylcyclohexyl mercaptan, and the like. Allyl mercaptan and butenyl mercaptan are typical examples of lower alkenyl mercaptans that can be used in the above defined reaction. Equally operable are aryl, alkaryl, aralkyl, haloaryl and haloaralkyl compounds exemplified by the following compounds:

mercaptobenzene,
2-mercaptonaphthalene,
p-mercaptotoluene,
o-mercaptotoluene,
m-mercaptotoluene,
3,4-dimercaptotoluene,
2,4-dimethylmercaptobenzene,
2,5-dimethylmercaptobenzene,
p-tert-butylmercaptobenzene,
1-methyl-2-mercaptonaphthalene,
4-ethyl-mercaptobenzene,
benzylmercaptan,
mercaptoethyl benzene,
mercaptopropyl benzene,
triphenylmethyl mercaptan,
mercaptomethyl naphthalene,
mercaptoethyl naphthalene,
mercaptobutylnaphthalene,
o-chloromercaptobenzene,
m-chloromercaptobenzene,
p-chloromercaptobenzene,
2,5-dichloromercaptobenzene,
p-bromomercaptobenzene,
o-iodomercaptobenzene,
p-iodomercaptobenzene,
o-chlorobenzyl mercaptan,
m-chlorobenzyl mercaptan,
p-chlorobenzyl mercaptan,
2,4-dichlorobenzyl mercaptan,
3,4-dichlorobenzyl mercaptan,
p-bromobenzyl mercaptan,
4-chloro-1-mercaptonaphthalene,
4-bromo-1-mercaptonaphthalene, and the like. Similarly, examples of carboalkoxy-alkyl mercaptans that can be reacted with phosgene according to the present invention are those compounds typified as esters of mercapto-acids. Suitable examples are methyl mercaptoacetate,
ethyl mercaptoacetate,
propyl mercaptoacetate,
butyl mercaptoacetate,
pentyl mercaptoacetate,
hexyl mercaptoacetate,
methyl α-mercaptopropionate,
ethyl α-mercaptopropionate,
pentyl α-mercaptopropionate,
methyl β-mercaptopropionate,
ethyl β-mercaptopropionate,
hexyl β-mercaptopropionate,
methyl α-mercaptobutyrate,
propyl α-mercaptobutyrate,
hexyl α-mercaptobutyrate,
methyl β-mercaptobutyrate,
ethyl β-mercaptobutyrate,
hexyl β-mercaptobutyrate,
methyl γ-mercaptobutyrate,
ethyl γ-mercaptobutyrate,
hexyl γ-mercaptobutyrate,
methyl β-mercaptovalerate,
ethyl β-mercaptovalerate,
hexyl β-mercaptovalerate,
methyl δ-mercaptovalerate,
ethyl δ-mercaptovalerate,
hexyl δ-mercaptovalerate, and the like.

The catalysts of the present invention are equally useful in the reaction of phosgene and a dithiol and the selectivity of the catalysts is equally effective as activated carbon, both of which are described in detail in the inventor's previously mentioned patent.

The following synthetic methods were used in carrying out the present invention and the table following gives the results of such runs.

*Synthetic Method A*

500 cc. 4-neck flask was provided with stirrer, thermometer, gas inlet tube and Dry Ice condenser. The mercaptan and catalyst were charged and then an excess of phosgene was passed in, maintaining the temperature between 20–30° C. with cooling. The time of addition varied between 15 minutes to an hour. After the addition was completed, the reaction mixture was allowed to stir for several hours without any external cooling, but the Dry Ice condenser was kept full. Most of the excess phosgene was then stripped out with air at a temperature of 20–30° C. The reaction mixture was washed with 4–100 cc. portions of water. If the amide catalyst was water insoluble, the reaction mixture was not washed.

After washing, the reaction product was dried over a small amount of anhydrous magnesium sulfate, filtered, and the filtrate was brought to reflux under water pump vacuum in order to remove the volatile impurities. The cooling water in the reflux condenser was maintained at such a temperature that the chlorothiolformate would condense, but the mercaptan would not condense. After the distilland temperature had remained constant for ten minutes, the refluxing was stopped, the yield was obtained and the refractive index of the product was taken.

*Synthetic Method B*

This method was the same as A except that the reaction mixture was diluted with 100–200 cc. of n-pentane before washing. After the washing was completed, and the mixture was dried over anhydrous magnesium sulfate, the n-pentane was removed on the steam bath. This always resulted in some loss by evaporation of the lower alkyl chlorothiolformates. It was then brought to reflux under water pump vacuum.

*Synthetic Method C*

This method was the same as B except that the product was vacuum distilled after refluxing under vacuum in order to separate it from high boiling impurities.

*Synthetic Method D*

This method was the same as A except that the product was vacuum distilled after refluxing under vacuum in order to purify it from high boiling impurities.

alkenyl and phenyl; or when $R_4$ is a hydrogen, lower alkyl, lower alkenyl or phenyl, $R_2$ and $R_3$ jointly are a divalent alkylene of a chain length of from 3 to 5 carbon atoms, inclusive; or when $R_2$ is a hydrogen, lower alkyl, lower alkenyl or phenyl, $R_3$ and $R_4$ jointly are a divalent alkylene of a chain length of from 4 to 6 carbon atoms, inclusive, will act as catalysts. When amide type catalysts containing $R_3$ and $R_4$ radicals individually are used at least one of said radicals must be a hydrocarbon radical.

I claim:

A method for preparing chlorothiolformates in which method organic mercaptans selected from the group consisting of alkyl, cycloalkyl, lower alkenyl, phenyl, substituted-phenyl, naphthyl and substituted-naphthyl phenalkyl, naphthalkyl, halophenalkyl, halonaphthalkyl wherein said substituents are lower alkyl and halogen and carboalkoxyalkyl mercaptans are reacted with phosgene, said improvements comprising carrying out said reaction in the presence of a catalytic amount of an amide catalyst having the formula

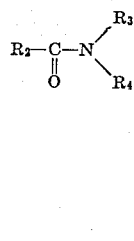

TABLE $$R_1SH + COCl_2 \longrightarrow R_1S\!-\!COCl + HCl$$

Amide Type Catalysts 

| $R_1$ | Moles of $R_1SH$ | Moles of $COCl_2$ | Moles of Catalyst | Synthesis Method | Yield of Chlorothiolformate | $n_D^{30}$ of Chlorothiolformate | $R_2$ | $R_3$ | $R_4$ |
|---|---|---|---|---|---|---|---|---|---|
| $C_2H_5$ | 1.00 | 1.22 | 0.03 | A | 79 | 1.4774 | H | $CH_3$ | $CH_3$ |
| n-$C_3H_7$ | 1.00 | 1.20 | 0.06 | A | 84 | 1.4748 | $CH_3$ | $CH_3$ | $CH_3$ |
| i-$C_3H_7$ | 1.00 | 1.21 | 0.03 | A | 76 | 1.4690 | H | $CH_3$ | $CH_3$ |
| n-$C_4H_9$ | 1.00 | 1.21 | 0.03 | A | 86 | 1.4741 | H | $CH_3$ | $CH_3$ |
| t-$C_4H_9$ | 1.00 | 1.20 | 0.07 | B | 66 | 1.4691 | H | $CH_3$ | $CH_3$ |
| n-$C_8H_{17}$ | 1.00 | 1.20 | 0.03 | C | 86 | 1.4721 | H | $CH_3$ | $CH_3$ |
| Phenyl | 0.30 | 0.40 | 0.04 | D | 68 | 1.5787 | H | $CH_3$ | $CH_3$ |
| n-$C_3H_7$ | 1.00 | 1.20 | 0.05 | A | 82 | 1.4749 | —$CH_2CH_2CH_2$— | | $CH_3$ |
| n-$C_3H_7$ | 1.00 | 1.20 | 0.03 | A | 88 | 1.4754 | $ClCH_2$ | $C_2H_5$ | $C_2H_5$ |
| n-$C_3H_7$ | 1.00 | 1.20 | 0.04 | A | 88 | 1.4753 | $CH_3$ | H | n-$C_4H_9$ |
| n-$C_3H_7$ | 1.00 | 1.20 | 0.04 | A | 88 | 1.4746 | $CH_2\!=\!CH$ | H | t-$C_4H_9$ |
| n-$C_3H_7$ | 1.00 | 1.20 | 0.02 | D | 61 | 1.4759 | $CH_3$ | Phenyl | Phenyl |
| n-$C_3H_7$ | 1.00 | 1.24 | 0.04 | D | 88 | 1.4749 | —$CH_2CH_2CH_2CH_2$— | | Phenyl |
| n-$C_3H_7$ | 1.00 | 1.26 | 0.02 | D | 84 | 1.4750 | H | Phenyl | Phenyl |
| n-$C_3H_7$ | 1.00 | 1.23 | 0.05 | A | 80 | 1.4748 | $C_2H_5$ | $C_2H_5$ | $C_2H_5$ |
| n-$C_3H_7$ | 1.00 | 1.20 | 0.07 | C | 60 | 1.4750 | H | $C_2H_5$ | $C_2H_5$ |
| n-$C_3H_7$ | 1.00 | 1.20 | 0.08 | C | 44 | 1.4760 | H | H | $CH_3$ |
| n-$C_3H_7$ | 1.00 | 1.20 | 0.04 | B | 81 | 1.4746 | $C_2H_5$ | $C_2H_5$ | $C_2H_5$ |
| n-$C_3H_7$ | 1.00 | 1.20 | 0.04 | B | 72 | 1.4750 | H | $CH_3$ | n-$C_4H_9$ |
| n-$C_3H_7$ | 1.00 | 1.20 | 0.07 | B | 77 | 1.4751 | $CH_3$ | H | $CH_3$ |
| n-$C_3H_7$ | 1.00 | 1.20 | 0.06 | B | 79 | 1.4752 | $CH_3$ | H | $C_2H_5$ |
| n-$C_4H_9$ | 1.00 | 1.20 | 0.06 | A | 90 | 1.4740 | $CH_3$ | $CH_3$ | $CH_3$ |

In carrying out the process of the present invention, it is advisable that the reaction temperatures be maintained as low as possible, consonant with reasonable reaction rates. As is known, the mercaptans exhibit varying reactivities and this must be taken into account in selecting optimum reaction temperatures.

The process of the present invention is applicable with any ratio of reactants but economics dictate that approximately stoichiometric quantities be employed or, as is the preferred embodiment, a slight excess of phosgene be used.

Any amide type catalysts of the formula:

wherein $R_2$, $R_3$ and $R_4$ are selected from the group consisting individually of hydrogen, (lower) alkyl, (lower)

wherein $R_2$, $R_3$ and $R_4$ are selected from the group consisting individually of hydrogen, lower alkyl, lower alkenyl and phenyl; or when $R_4$ is hydrogen, lower alkyl, lower alkenyl or phenyl $R_2$ and $R_3$ jointly are a divalent alkylene of a chain length of from 3 to 5 carbon atoms, inclusive; or when $R_2$ is a hydrogen, lower alkyl, lower alkenyl or phenyl, $R_3$ and $R_4$ jointly are a divalent alkylene of a chain length of from 4 to 6 carbon atoms, inclusive; provided that in all said catalysts containing both $R_3$ and $R_4$ groups, individually, at least one of said groups is a hydrocarbon.

No references cited.

CHARLES B. PARKER, *Primary Examiner.*

JOSEPH P. BRUST, *Examiner.*

D. R. MAHANAND, *Assistant Examiner.*